E. B. CUSHMAN.
MOTOR SUPPORTING BRACKET FOR HARVESTING MACHINES.
APPLICATION FILED DEC. 26, 1912.
1,073,099.
Patented Sept. 16, 1913.
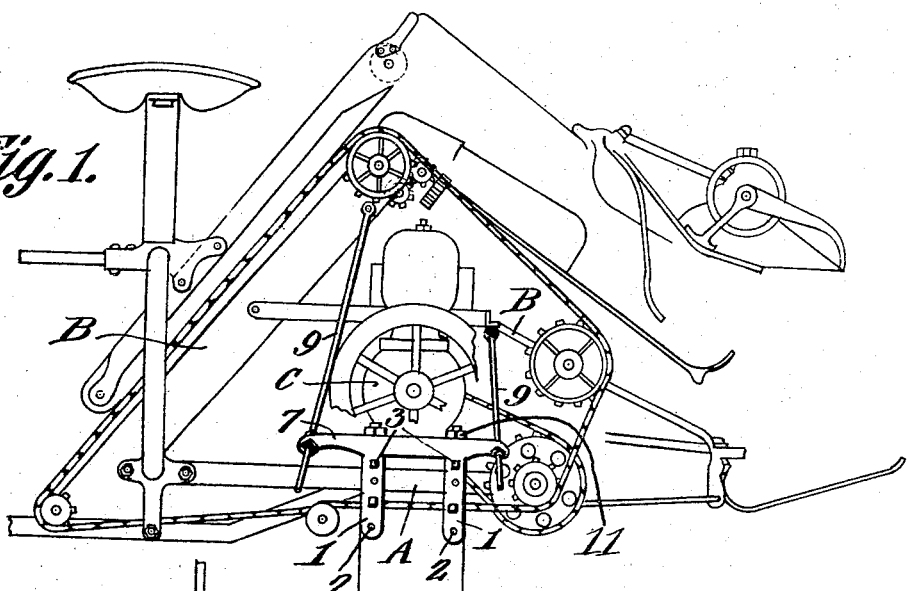
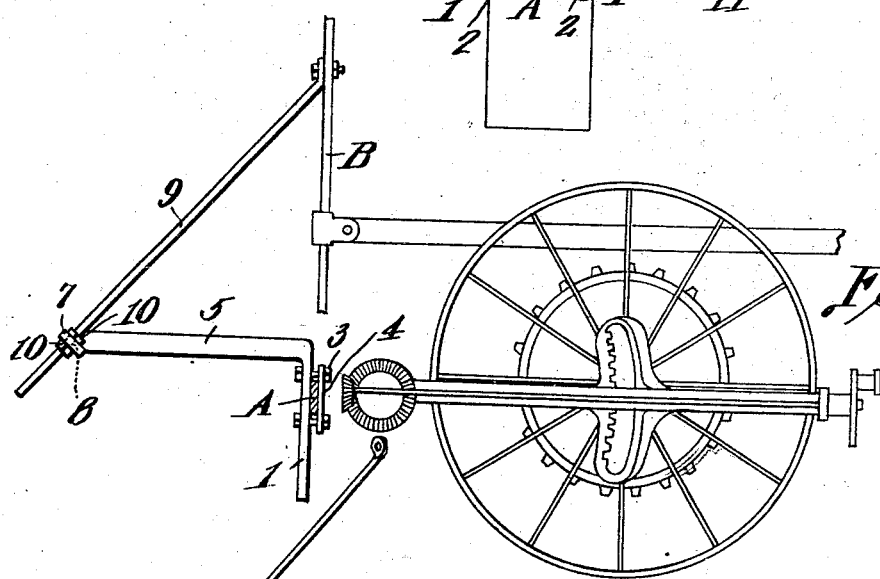
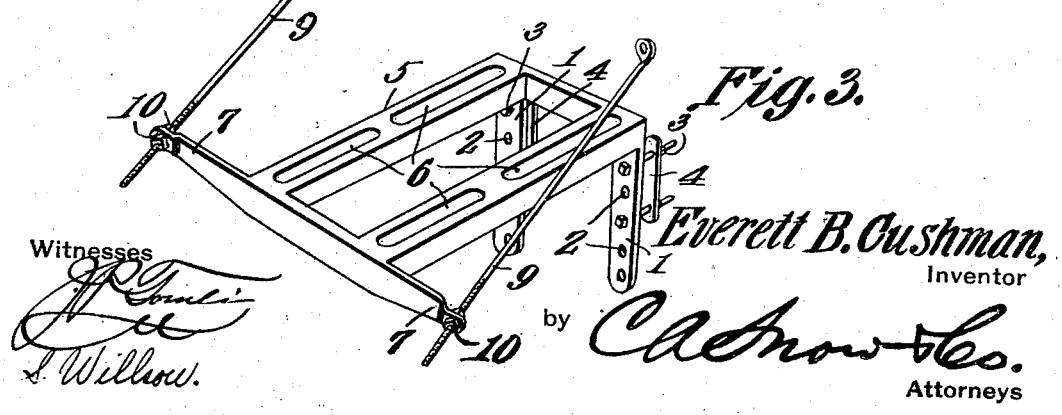
Everett B. Cushman,
Inventor
Witnesses
by
Attorneys

UNITED STATES PATENT OFFICE.

EVERETT B. CUSHMAN, OF LINCOLN, NEBRASKA, ASSIGNOR TO CUSHMAN MOTOR WORKS, OF LINCOLN, NEBRASKA.

MOTOR-SUPPORTING BRACKET FOR HARVESTING-MACHINES.

1,073,099.  Specification of Letters Patent.  Patented Sept. 16, 1913.

Application filed December 26, 1912. Serial No. 738,689.

*To all whom it may concern:*

Be it known that I, EVERETT B. CUSHMAN, a citizen of the United States, residing at Lincoln, in the county of Lancaster and State of Nebraska, have invented a new and useful Motor-Supporting Bracket for Harvesting-Machines, of which the following is a specification.

This invention relates to brackets for supporting motors upon harvesters.

It has been found that by utilizing motors for driving the harvesting mechanism of harvesting machines that fewer draft animals need be employed for propelling the machine over the ground, this being due to the fact that the energy exerted by said animals is utilized solely for pulling the machine and not for driving any of the mechanism supported by the machine. For this reason various means have been devised for mounting motors upon different makes of harvesting machines now in use, these motors being employed for driving the harvesting mechanism so that the number of horses to be employed is reduced to the minimum inasmuch as they are only used for drawing the machine over the ground. The means employed for connecting motors to machines already in use have been objectionable for the reason that it has been necessary to make a particular form of motor supporting structure for each make of harvesting machine in use and, as a result, the cost of placing these attachments upon the market has been objectionable.

The principal object of the present invention is to provide an adjustable bracket designed to fit harvesters of different makes and which will properly support a motor in position to drive the harvesting mechanism of the machine, the bracket being of such simple construction as to be easily placed in position without requiring the services of a skilled mechanic.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a rear elevation of a portion of a machine having the present improvements applied thereto. Fig. 2 is a side elevation of the bracket, a portion of the machine being shown. Fig. 3 is a perspective view of the bracket.

Referring to the figures by characters of reference A designates a cross beam constituting a portion of the frame of a harvester, said beam being located back of the axle of the machine. Arranged back of this beam A are arms 1 each of which has a series of apertures 2 therein for the reception of clamping bolts 3 which are designed to extend above and below the beam A and to engage a clamping plate 4 arranged in front of the beam A. Obviously, by tightening the bolts the beam can be tightly gripped between the arms 1 and plate 4 and said arms thus held rigidly against the beam.

Arms 1 are arranged at one end of a platform 5 which can be formed of a steel or malleable casting of any preferred size and, if desired, the arms 1 can be integral with this platform. The platform is preferably formed with slots 6 adjacent the sides thereof and the middle portion of the platform can be removed so as thus to lighten and cheapen the device without reducing its efficiency. Lateral extensions 7 may be provided at the rear end of the platform, these extensions being formed with openings 8 to receive the end portions of truss rods 9. These rods are adapted to be bolted or otherwise secured at their upper ends to an upstanding portion B of the harvester frame and those portions of the rods extending through the extensions 7 are preferably screw threaded so as to be engaged by nuts 10 arranged above and below the extensions 7.

It will be apparent that by screwing the nuts 10 back and forth upon the truss rods 9 and adjusting the arms 1 upwardly or downwardly relative to the beam A, the entire bracket can be so arranged as to be easily attached to different makes of harvesting machines now in use. The rods 9 are not only adjustably mounted within the extensions 7 but are also capable of being swung to any desired angle relative to the platform 5 simply by loosening the nuts 10 sufficiently to permit of such movement.

Platform 5 is adapted to support a motor C, this motor being secured in place by bolts 11 extending through the slots 6. Thus any desired adjustment of the motor toward or from the beam A is permitted. Obviously by adjusting the motor in this manner and by sliding the bracket longitudinally of the beam A, adjustment of the motor in all directions may be effected.

What is claimed is:—

1. A motor supporting attachment for harvesting machines including a platform having longitudinal slots for the reception of motor fastening means, apertured arms extending from one end of the platform, means adjustably engaging the arms for clamping them upon a portion of a harvester structure, and supporting rods connected to that end of the platform remote from the arms.

2. A motor supporting attachment for harvesting machines including a platform having longitudinal slots for the reception of motor fastening means, apertured arms extending from one end of the platform, means adjustably engaging the arms for clamping them upon a portion of a harvester structure, lateral extensions upon that end of the platform remote from the arms, and supporting rods adjustable longitudinally within the extensions.

In testimony that I claim the foregoing as my own, I have hereto affixed my signature in the presence of two witnesses.

EVERETT B. CUSHMAN.

Witnesses:
GRACE E. MILLS,
NINA VAN OSTRAND.

Copies of this patent may be obtained for five cents each, by addressing the "Commissioner of Patents, Washington, D. C."